United States Patent [19]
Reid

[11] Patent Number: 4,950,034
[45] Date of Patent: Aug. 21, 1990

[54] SHAFT EXCAVATION METHOD

[75] Inventor: Neil Reid, Buckinghamshire, England

[73] Assignee: Trigon Geoducts Limited, London, England

[21] Appl. No.: 421,462

[22] Filed: Oct. 16, 1989

[30] Foreign Application Priority Data

Oct. 14, 1988 [GB] United Kingdom ............... 8824111

[51] Int. Cl.⁵ .................... B28D 1/08; E21C 41/12
[52] U.S. Cl. .................................... 299/15; 125/21; 299/35
[58] Field of Search ................. 175/89, 90; 299/15, 299/35; 125/12, 21

[56] References Cited

U.S. PATENT DOCUMENTS 1,967,117  7/1934  Gerdetz .
4,832,411  5/1989  Johnston et al. ............... 299/35 X

FOREIGN PATENT DOCUMENTS 834921   12/1938  France .
1416696  8/1988   U.S.S.R. ......................... 299/35
8908525  9/1989   World Int. Prop. O. ........... 125/21

Primary Examiner—Thuy M. Bui
Assistant Examiner—David J. Bagnell
Attorney, Agent, or Firm—Cushman, Darby & Cushman

[57] ABSTRACT

A method for sinking a shaft having a wide diameter e.g. 4 meters. A concrete diaphragm wall is formed with five radially inwardly extending sections (12), in each of which a guide hole (13) is formed. Five outer boreholes are drilled to depth using the guide holes and a central borehole (14) is also drilled to depth. The ground within the wall is excavated to rock level. Vertical cuts are made between adjacent outer boreholes (14) and between the central borehole (14) and the outer boreholes (15) using a wire (19) saw cutter. Cross cuts are then made to form separated segments (33) of rock which are removed sequentially. This is repeated progressively downwards to the required depth.

15 Claims, 3 Drawing Sheets

SHAFT EXCAVATION METHOD

The present invention relates to a shaft excavation system, though it is equally applicable to forms of excavation other than simply vertical shafts. The invention therefore extends to tunnelling and all other forms of excavation at any inclination between horizontal and vertical. However, for the purposes of this specification, specific reference will be made only to vertical shaft sinking, to which the invention is particularly applicable.

There are many known ways of sinking a shaft, the majority of which rely on a drilling principle. However, there is a practical limit to the size of a borehole which is achievable using a drill bit, currently about 26 inches (66 cm). This can be reamed out to perhaps about 3 feet (1 meter) is hard rock and to a somewhat larger diameter in soft rock. If a shaft having a greater diameter might be required it is necessary to resort to blasting.

Blasting is highly undesirable due to many reasons. Firstly, it is slow, since personnel must be evacuated and the debris produced must be cleared. Secondly, it weakens the rock structures, and causes cracks in the shaft wall. Thirdly, it requires highly skilled personnel. Finally, it can be environmentally unpopular.

In certain deep mining applications, for example up to 6,000 m, very wide shafts may be desirable to service, amongst other things, ventilation requirements. At such depths, it may not be possible to use a tunnelling approach from a distance of perhaps some miles (several kilometers) away, due to the extremely high temperatures encountered.

It is therefore an object of the present invention to provide a system which enables a wide shaft to be sunk (or tunnel to be excavated) without the need to resort to explosives.

It is a further object of the invention to provide a shaft sinking system which is capable of producing a shaft having a diameter of about 4 meters or greater.

According to one aspect of the invention, there is provided a method for excavating a bore through rock which comprises: drilling an inner borehole, drilling a serious of outer boreholes surrounding the inner borehole; cutting the rock material between first and second adjacent outer boreholes to form an outer cut; cutting the rock material between the inner borehole and each of the first and second outer boreholes to form two radial cuts; the outer cut and two radial cuts thereby defining a first rock segment; cutting a cross cut through the first rock segment to join the outer and radial cuts, thereby freeing the first rock segment; removing the first rock segment; forming further similar outer cuts, radial cuts and cross cuts to free further rock segments; removing the further rock segments; and repeating the cutting and removal procedures progressively along the bore until the required extend has been attained.

In a preferred embodiment, the invention comprises a method for sinking a shaft in which the boreholes are vertical, the outer and radial cuts are vertical and the cross cuts are generally horizontal.

The preferred number of outer boreholes is five or possibly six though more may be used. The number can be chosen in dependence upon the size of shaft required. It is not believed to be advantageous to employ only two or three outer boreholes, though four may be used. Preferably the outer broeholes are on a circumferential and the inner borehole is in a central position. Preferably the boreholes are drilled to the required extent or depth at the outset though they can be drilled in stages. Similarly, the central borehole is preferably reamed to depth at the outset, though this can also be done in stages.

A suitable cutting apparatus is a wire saw cutter. This uses an endless cutting line or wire which may have natural or synthetic diamond impregnated sections. The wire is driven while maintained under tension in contact with the rock to be cut. As for as the present invention is concerned, it is particularly applicable since the wire guides can be located in the boreholes to position to cuts where required, while the drive can be elsewhere, at a convenient location.

As the wire progresses through the rock during a cut, it will be understood that the free length of the wire will change, depending on whether the cut is made towards or away from the drive. Thus, the slack or tightness can be accommodated either by periodically adjusting the actual length of the wire, or by moving the drive. However in the present case, it is preferred to accommodate the change by incorporating a movable guide or guides for the wire. The movable guide may be positioned in the central borehole and may be arranged to move vertically. One way of regulating this accommodation would be to maintain a constant tension in the wire by movement of the guide.

Another suitable cutting apparatus might be a swinging arc chain cutter, effectively a rock chain saw. However, this may not be convenient for the outer and radial cuts nor for the first cross cut. It could conveniently be used for the subsequent cross cuts.

The cuts can be carried out in any order and indeed more than one cut could be made at one time. Also, the cut segments of rock can be removed in any order.

Preferably, the vertical cuts are made to a predetermined depth, somewhat greater than the crosscut depth, and all the rock segments are removed from that level prior to making further vertical cuts to a greater depth. Preferably holes are drilled in the rock segments by means of which the rock segments are removed from the bore. These may be drilled to depth at the outset or may be drilled as excavation progresses. Preferably they are located to pass through the centre of gravity of the rock segments where one per segment is employed. Alternatively a plurality of such holes may be formed in each segment. In both cases, the positioning of the holes can facilitate removal of the rock segments. The segments themselves may be a useful by-product for use for example in building applications and other civil engineering projects.

Preferably, any soft ground above the rock level is removed by forming a diaphragm wall having a circumference greater thanthat of the final shaft, down to the rock level, and subsequently excavating the soft ground down to the rock level. Typically, the diaphragm wall is formed by removing sections, filling them with excavating fluid, and displacing the fluid with concrete, the sections including generally circumferential sections and generally radial sections, the radial sections including vertical guide holes corresponding in position to the required positions of the outer boreholes. The guide holes may be formed by inserting pipes or poles into the wet concrete at the required position and removing these just before the concrete sets. The outer boreholes are then drilled to depth using the guide holes left.

In a preferred system, after the outer and inner boreholes have been drilled and the tops of the sections have been tied, the soft ground is excavated, the bottoms of the sections are tied and the inner borehole is reamed. It is of course possible to drill the centre borehole from ground level before removal of the topsoil etc. However, the central borehole may be drilled after excavation of the soft ground, either by drilling at rock level or by erecting staging across the diaphragm wall.

As will be appreciated, the system according to the invention provides a method of sinking a shaft (or forming a tunnel etc.) with a large diameter, without the need to resort to blasting. It can be operated quickly, simply and inexpensively without personnel trained in the use of explosives.

The invention may be carried into practice in various ways and one embodiment will now be described by way of example with reference to the accompanying drawings, in which:

FIG. 3 is a schematic part-plan showing the vertical cut lines;

Figure 1:
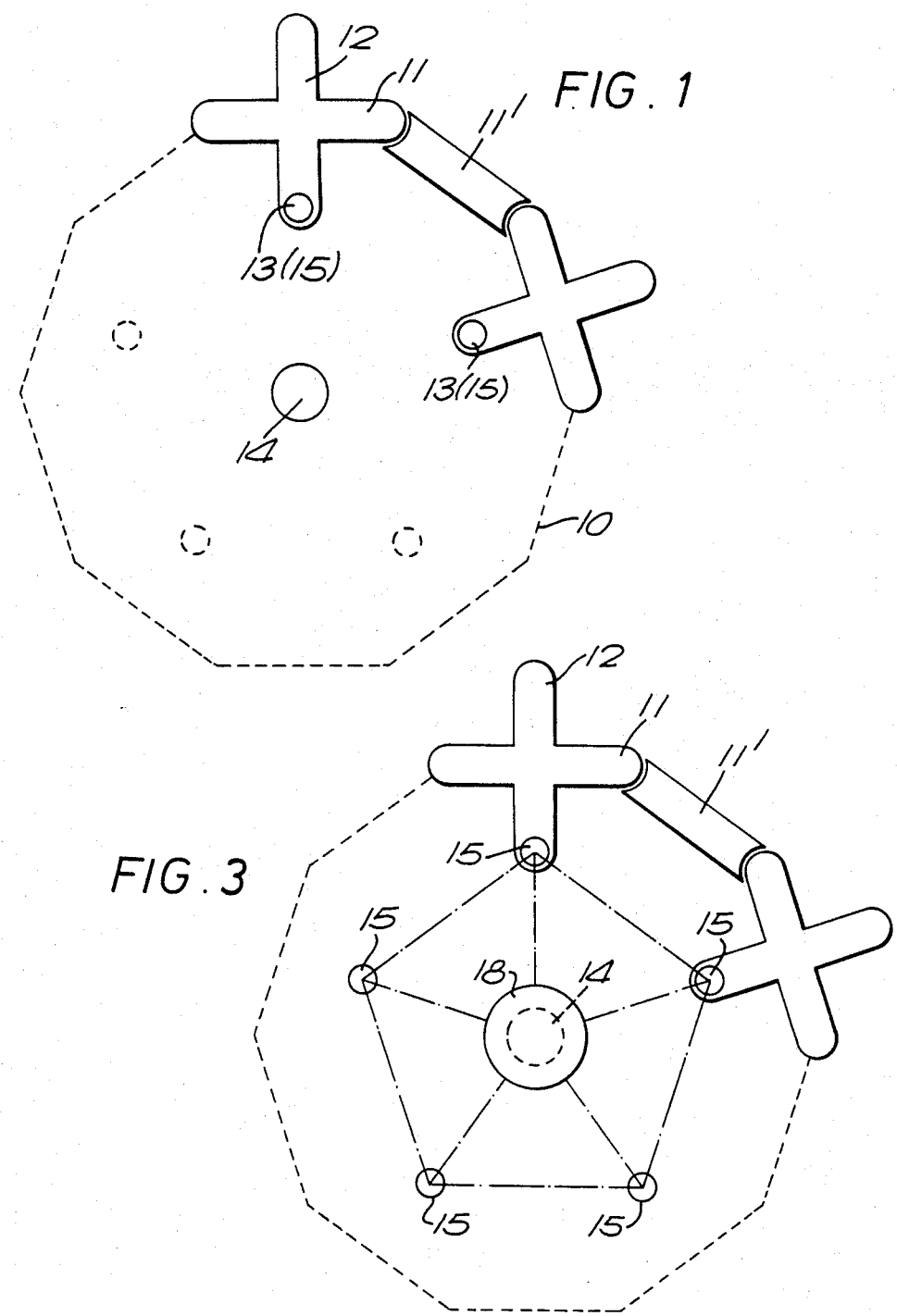
FIG. 1 is a schematic part-plan view of a system in accordance with the invention during formation of the diaphragm wall.

In preparing the ground for sinking a shaft in accordance with the present invention, it is first marked out with a regular decagon 10. A flat faced grab is then used to remove a series of vertical panel excavations corresponding to the sides of the decagon 10. The panel excavations are excavated alternately and down to rock level. As the material is removed, excavating fluid is infilled to replace the material removed. When a panel excavation has been comleted the excavating fluid is displaced by concrete to form a vertical concrete panel 11 from ground down to rock level.

Each alternate panel is also formed in the same way with a radial panel 12. While the concrete in each of the five radial panels 12 is still wet, a pole or tube 13 is inserted at a position which corresponds to the perimeter of the shaft to be sunk. It will be appreciated that shafts of different diameter can be accommodated by adjusting the position of the poles 13, the position of the radial panels 12, or the total number of outer panels 11. The poles 13 are removed before the concrete has set to leave guide holes. The intermediate panels 11' can be formed with concave ends (as shown) to interconnect with the adjacent panels or linking pieces can be used between adjacent panels.

Figure 2:
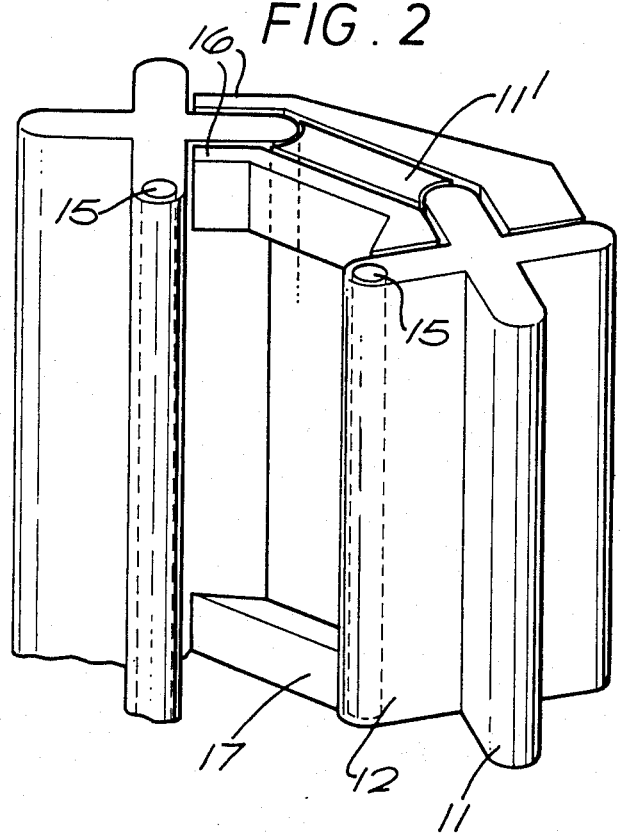
FIG. 2 is an isometric sketch of part of the diaphragm wall of FIG. 1.

When all the panels 11, 11' have been formed and poles 13 removed, a central borehole 14 is drilled to the shaft depth and five outer boreholes 15 are drilled to the shaft depth using the guide holes. The material within the panels is then removed down to the rock level. The diaphragm wall is completed by tying the tops of the panels 11 together with shoulder pieces 16 and tying the bottoms of the panels 11 with toe pieces 17 as shown in FIG. 2.

The central bore hole 14 is then reamed out to give a larger diameter central hole 18. this therefore leaves a large central hole 18 and five outer boreholes 14, as shown in FIG. 3.

Figure 6:
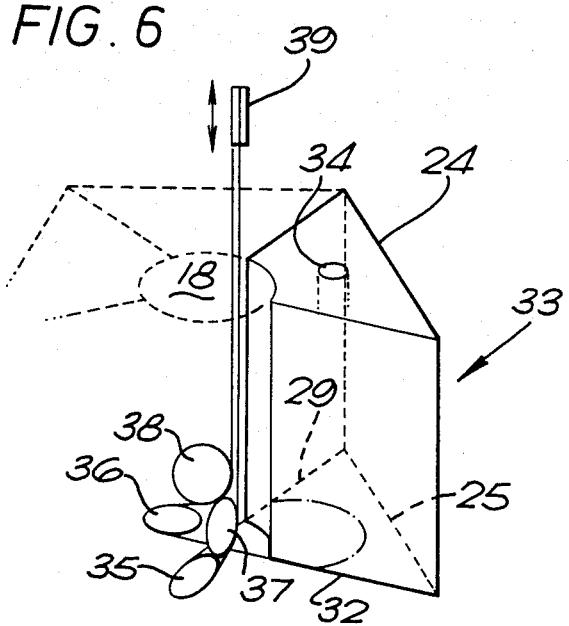
Figure 4:
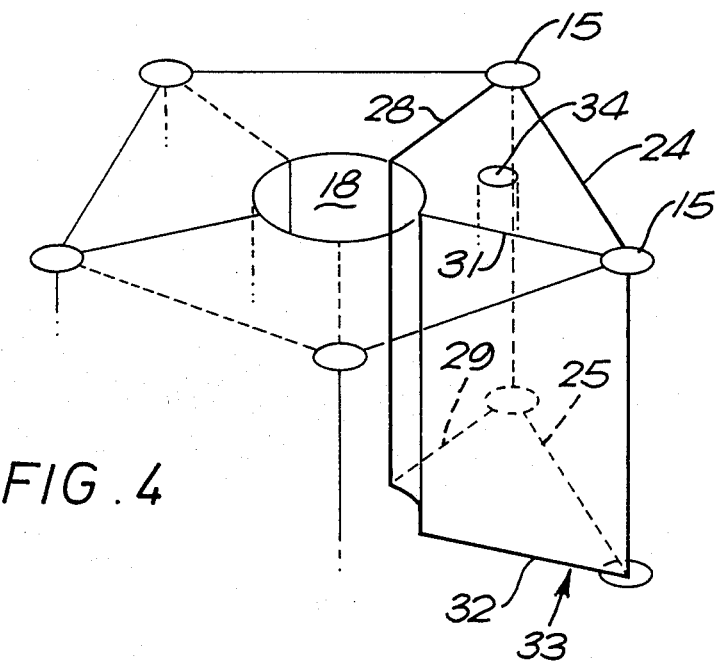
FIG. 4 is an isometric sketch showing a cut rock segment.

A wire 19 saw cutting machine can now be used to cut the rock material for removal to form the required shaft. The cut lines are shown in FIGS. 4, 5 and 6.

Figure 5:
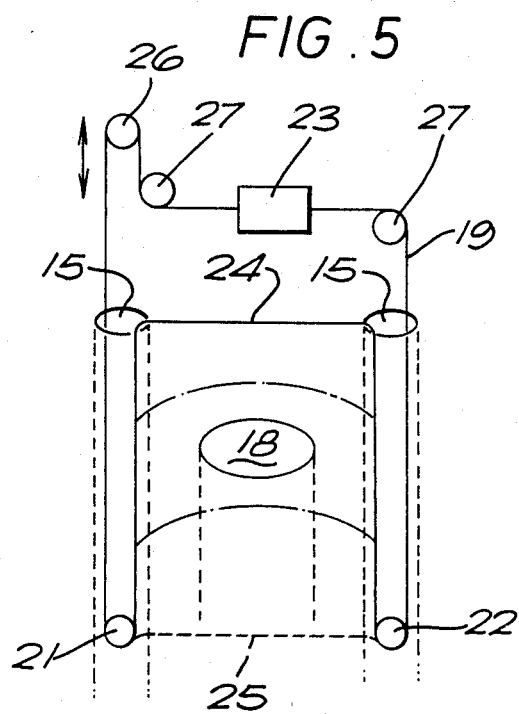
FIG. 5 is a diagrammatic sketch showing the cutting arrangement for an outer cut; and FIG. is an isometric sketch of the wire cutting arrangement for a cross cut.

Firstly, as shown in FIG. 5, guide pulleys 21,22 for the cutting wire 19 are passed down two adjacent outer boreholes 15, to a predetermined depth, perhaps about 3 meters. The drive 23 for the wire 19 may be located on the rock surface or in the central hole 18. The wire 19 is kept in tension and as it is driven, it cuts downwards, starting at line 24, until the cut reaches (or in practice, just passes) line 25, 3 meters below.

During the cutting process, slack in the wire 19 must be accommodated as the wire 19 progresses downwards from the initial position 24 via the intermediate positions (shown in chain lines in FIG. 5) to the final position 25. This is achieved by the use of a movable guide 26 which in the illustrated embodiment is arranged to move vertically upwards and to maintain a constant tension in the wire 19. The arrangement of the drive 23 and any other guides 27 itself may be movable. However, in the cases where the drive 23 is located within the central hole 18, the movable guide 26 is conveniently arranged to move vertically within the central hole 18.

When the cut 24/25 has been completed, the wire 19 is repositioned so that one guide e.g. 21 remains down one of the two outer boreholes 15 while another guide e.g. 22 is located in the central hole 18. A radial cut is then made from e.g. line 28 to line 29 in FIG. 4. This is repeated between the other adjacent outer boreholes 15 and the central hole 18 to cut from line 31 to line 32. Either at this stage, or earlier in the process, a lifting hole 34 is drilled in the rock segment 33 defined by the cut lines, at its center of gravity.

In order to detach the rock segment 33, a cross cut must be made. This is achieved by passing the wire 19 down the cut 24/25 and leading it into the central cavity 18 via the two radial cuts at lines 29 32. The wire 19 is guided around a pair of fixed generally horizontal guides 35, 36 and a pair of fixed generally vertical guides 37, 38 and between the latter, a movable vertical guide 39. (The drive has been omitted for clarity.) The path of the wire is therefore: line 25, line 32, guide 36, guide 38, guide 39, guide 37, guide 35, line 29 and back to line 25.

As the wire 19 is driven, the cross cut is made from line 25 towards the central hole 18. When the cross cut has just passed the lifting hole 34, an expanding hoist anchor support (not shown) is lowered down the lifting hole 35. This serves to support the segment 33 after the cross cut has been completed and provides a means for attachment of a hoist. Thus, once segment 33 after the cross cut has been completed and provides a means for attachment of a hoist. Thus, once the cross cut is complete the rock segment 33 is hoisted clear. The procedure is then repeated for the other four rock segments and the entire process is repeated at descending levels until the required depth is reached. Naturally, the order of cutting and hoisting can be varied and a number of cuts and hoists can be used simultaneously.

Any small debris would tend to drop down the central hole 18 and can be cleared after the boreholes so formed has been completed. The blocks or rock segments 33 represent a by-product that can be used in civil engineering.

While the invention is susceptible to various modifications and alternative forms, a specific embodiment thereof is shown by way of example herein. It should be understood, however, that it is not intended to limit the invention to the particular form disclosed, but on the contrary, the intention is to cover all modifications, equivalents, and alternatives falling within the spirit and scope of the invention as defined in the appended claims.

I claim:

1. A method for excavating a bore through rock which comprises: drilling an inner borehole, drilling a series of outer boreholes surrounding said inner borehole; cutting the rock material between first and second adjacent outer boreholes to form an outer cut; cutting the rock material between said inner borehole and each of said first and second outer boreholes to form two radial cuts; said outer cut and two radial cuts thereby defining a first rock segment; cutting a cross cut through the first rock segment to join said outer and radial cuts, thereby freeing the first rock segment; removing the first rock segment; forming further similar outer cuts, radial cuts and cross cuts to free further rock segments; removing the further rock segments; and repeating the cutting and removal procedures progressively along said bore until the required extent has been attained.

2. A method as claimed in claim 1 for sinking a shaft in which said boreholes are vertical, said outer and radial cuts are vertical and said cross cuts are generally horizontal.

3. A method as claimed in claim 2 in which said vertical cuts are made to a predetermined depth, somewhat greater than said crosscut depth, and all the rock segments are removed from that level prior to making further vertical cuts to a greater depth.

4. A method as claimed in claim 2 in which any soft ground above the rock level is removed by forming a diaphragm wall having a circumference greater than that of the final shaft, down to the rock level, and subsequently excavating the soft ground down to the rock level.

5. A method as claimed in claim 4, in which the wall of said diaphragm is formed by removing sections, filling them with excavating fluid, and displacing the fluid with concrete, the sections including generally circumferential sections and generally radial section, said radial sections including vertical guide holes corresponding in position to the required positions of said outer boreholes.

6. A method as claimed in claim 5 in which said outer boreholes are drilled to depth using said guideholes.

7. A method as claimed in claim 6 in which, after said outer and inner boreholes have been drilled and the tops of the sections have been tied, the soft ground is excavated, the bottoms of the sections are tied and the inner borehole is reamed.

8. A method as claimed in claim 1 in which there are 5 or 6 outer boreholes.

9. A method as claimed in claim 1 in which said outer boreholes are on a circumference and said inner borehole is in a central position.

10. A method as claimed in any claim 1 in which said boreholes are drilled to the required extent of the final bore, and said central bore hole is reamed also to the required extent of the final bore.

11. A method as claimed in claim 1 in which the cuts are all made using a wire saw cutter.

12. A method as claimed in claim 11 in which said wire saw cutter is located in said inner borehole and as the wire progresses through the rock material during a cut, the additional free length of wire is taken up by leading the wire over a guide which is arranged to move vertically.

13. A method as claimed in claims 11 in which, as said wire progresses through the rock material during a cut, the additional free length of wire is taken up by leading said wire over a guide which is movable to maintain a constant tension in said wire.

14. A method as claimed in of claim 1 in which at least said first cross cut is made with a wire saw cutter and the remaining cross cuts are made with a swinging arc chain cutter.

15. A method as claimed in claim 1 in which holes are drilled in the rock segments by means of which the rock segments are removed from said bore.

* * * * *